United States Patent
Eguchi et al.

(10) Patent No.: US 7,862,470 B2
(45) Date of Patent: Jan. 4, 2011

(54) VEHICLE TRANSMISSION

(75) Inventors: Takahiro Eguchi, Saitama (JP); Takeshi Kurata, Saitama (JP); Yuichiro Takemori, Saitama (JP); Yasuhiro Hara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 762 days.

(21) Appl. No.: 11/898,970

(22) Filed: Sep. 18, 2007

(65) Prior Publication Data

US 2008/0070750 A1     Mar. 20, 2008

(30) Foreign Application Priority Data

Sep. 20, 2006     (JP)     ............... P2006-254683

(51) Int. Cl.
    B60W 10/06     (2006.01)
    B60W 10/10     (2006.01)
    B60W 10/18     (2006.01)

(52) U.S. Cl. .......................................... 477/40; 477/46

(58) Field of Classification Search .................. None
    See application file for complete search history.

(56) References Cited

U.S. PATENT DOCUMENTS 4,750,385 A     6/1988     Yamamoto et al.
5,085,104 A *   2/1992     Kouno et al. ............... 477/40
2003/0064855 A1 * 4/2003   Tanaka et al. ............. 477/115

FOREIGN PATENT DOCUMENTS

| EP | 0 241 216 A2 | 10/1987 |
| EP | 0 947 742 A2 | 10/1999 |
| EP | 1 291 559 A2 | 3/2003 |
| JP | 63-074735 A | 4/1988 |
| JP | 63-74735 A | 4/1988 |
| WO | WO 2005/065982 A1 | 7/2005 |

* cited by examiner

Primary Examiner—Sherry L Estremsky
Assistant Examiner—Erin D Bishop
(74) Attorney, Agent, or Firm—Arent Fox LLP (57) ABSTRACT

A speed change control device carries out speed change control of a stepless speed change mechanism in accordance with the vehicle speed. The speed change control device includes: first vehicle speed selection means for comparing a first vehicle speed obtained from the rotation speed of an output member 26 of the stepless speed change mechanism and a second vehicle speed obtained from the rotation speed of the wheels and for selecting the lower of the first and second vehicle speeds as the substitute vehicle speed; and second vehicle speed selection means for comparing the third vehicle speed obtained from the output side rotation speed of a clutch mechanism and the substitute vehicle speed, and for selecting the higher of the third vehicle speed and the substitute vehicle speed as the control vehicle speed. The control vehicle speed is used as the vehicle speed V for carrying out speed change control.

5 Claims, 4 Drawing Sheets

| | | a | b | c | d | e | f | g |
|---|---|---|---|---|---|---|---|---|
| $V_{sub}$ | $V_1$ ($N_{ABS}$) | ○ | ○ | + | ○ | − | ○ | ○ |
| | $V_2$ ($N_{DN}$) | ○ | + | ○ | − | ○ | ○ | ○ |
| $V_3$ ($N_{EL}$) | | ○ | ○ | ○ | ○ | ○ | − | + |
| $V_C$ | | $V_1 \sim V_3$ | $V_1, V_3$ | $V_2, V_3$ | $V_3$ | $V_3$ | $V_1, V_2$ | $V_3$ |

Fig. 4

VEHICLE TRANSMISSION

FIELD OF THE INVENTION

The present invention relates to a vehicle transmission which is constituted to have a speed change mechanism that changes the speed of the output of the engine and transmits the same to the vehicle wheels, and a speed change control device that controls the speed change of the speed change mechanism in accordance with the vehicle speed and the position of the engine throttle or the accelerator pedal.

BACKGROUND OF THE INVENTION

Conventionally, there have been various proposals for speed change control of vehicle stepless speed change mechanisms. For example, types in which the engine rotation speed is set to a target value in accordance with the speed of the vehicle and control to change the speed change ratio is carried out to make the actual engine rotation speed equal to the target value, and types in which the speed change ratio of a stepless speed change device is set to a target value in accordance with the speed of the vehicle in a similar manner and control to change the speed change ratio is carried out to make the speed change ratio equal the target value are known. In order to carry out speed change control or other controls on a stepless speed change device in accordance with the operating conditions of the vehicle, a plurality of sensors is provided to measure the rotation speed of the rotating members that constitute the power transmission path from the engine to the wheels.

In a speed change control device, the vehicle speed is obtained from the rotation speed of the rotating members that constitute the power transmission path. The vehicle speed obtained is used as an input parameter for setting the target value in speed change control. Generally the vehicle speed is obtained from the rotation speed of the rotating member on the output side of a clutch mechanism used for controlling the starting of the vehicle and the like. In other words, the vehicle speed is obtained from the rotation speed immediately prior to being transmitted to the wheels. Conventionally, a control device is known in which back up control (fail safe control) is carried out by detecting the breakdown of the sensor that outputs the measurement value for obtaining the vehicle speed. When a breakdown is detected, the vehicle speed is obtained alternatively from the measurement value of a sensor that detects the rotation speed of another rotating member. Then the speed change control continues to be carried out using this vehicle speed (see for example, Japanese Patent Application Laid-open No. S63-74735).

In the conventional form of speed change control, during the time after a breakdown occurs and until the breakdown is detected, the back up control is started, and its effect starts to operate, speed change control is carried out that is not suitable for the operating conditions based on the measurement value of the sensor with a breakdown. In this way, the fuel consumption and running properties could have become worse due to the vehicle running with a speed change ratio that is not appropriate to the operating conditions. In particular, because detection of breakdown of the sensor that measures the rotation speed of the wheels is not carried out using a rotating member of the speed change mechanism, this time period tends to be long.

SUMMARY OF THE INVENTION

With the foregoing problem in view, it is an object of the present invention to provide a vehicle transmission with improved fuel consumption and running properties, by preventing the use in speed change control of the vehicle speed obtained from the measurement value of a faulty sensor for measuring the rotation speed of the wheels.

To achieve this object, the vehicle transmission according to the present invention is a vehicle transmission comprising: a speed change mechanism which is mounted in a vehicle, and which changes the speed of output of an engine and transmits the output to wheels; a clutch mechanism disposed in a power transmission path from the speed change mechanism to the wheels, and which engages and disengages power transmission via the power transmission path; and a speed change control device which carries out speed change control of the speed change mechanism in accordance with the speed of the vehicle and the position of a throttle of the engine or an accelerator pedal, wherein the speed change control device comprises: first vehicle speed selection means for comparing a first vehicle speed obtained from a rotation speed of the wheels and a second vehicle speed obtained from a rotation speed of an output member of the speed change mechanism, and selecting the lower of the first and second vehicle speeds as a substitute vehicle speed; and second vehicle speed selection means for comparing a third vehicle speed obtained from an output side rotation speed of the clutch mechanism and the substitute vehicle speed, and selecting the higher of the third vehicle speed and the substitute vehicle speed as the control vehicle speed, the vehicle transmission.

Carrying out speed change control using the control speed as the vehicle speed.

Also, the vehicle transmission preferably comprises a braking control device that controls braking force applied to the wheels in accordance with the rotation speed of the wheels. Also, preferably the speed change mechanism is a stepless speed change mechanism that changes the speed of the output of the engine without steps. At this time, the speed change control device may set a target value of the engine rotation speed in accordance with the speed of the vehicle and the position of the throttle of the engine, and carry out control to change the speed change ratio of the stepless speed change mechanism so that the actual engine rotation speed is made to coincide with the target value. Also, the speed change control device may set a target value of the speed change ratio of the stepless speed change mechanism in accordance with the speed of the vehicle and the position of the throttle of the engine, and carry out control to change the speed of the stepless speed change mechanism so that the actual speed change ratio obtained from the rotation speeds of the input member and the output member of the stepless speed change mechanism is made to coincide with the target value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

ADVANTAGEOUS EFFECTS OF THE INVENTION

According to the vehicle transmission of the present invention, even if a breakdown occurs in the sensor that measures the rotation speed of the output member of the speed change mechanism, or the sensor that measures the rotation speed of the output side member of the clutch mechanism disposed between the speed change mechanism and the wheels, using the first and second vehicle speed selection means a faulty value is not set as the control vehicle speed. In particular, the lower of the first and second vehicle speeds is selected as the substitute vehicle speed, and the higher of the substitute vehicle speed and the third vehicle speed is selected as the control speed. Therefore, speed change control based on a faulty value is prevented in the event that the sensor that measures the rotation speed of the output member of the speed change mechanism or the sensor that measures the rotation speed of the wheels is measuring a faulty value on the high side or on the low side of the correct value, or in the event that the sensor that measures the rotation speed of the output side member of the clutch mechanism is measuring a faulty value on the high side of the correct value. In this way, setting a speed change ratio that is not suitable for the operating conditions does not occur, and worsening of the fuel consumption and running properties is prevented.

Also, by providing a braking control device that controls the braking force applied to the wheels in accordance with the rotation speed of the wheels, it is possible to share the sensors that measure the rotation speed of the wheels between speed change control and braking force control. Therefore it is possible to provide a vehicle transmission having the above effects without increasing the number of sensor components and minimizing the increase in cost.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
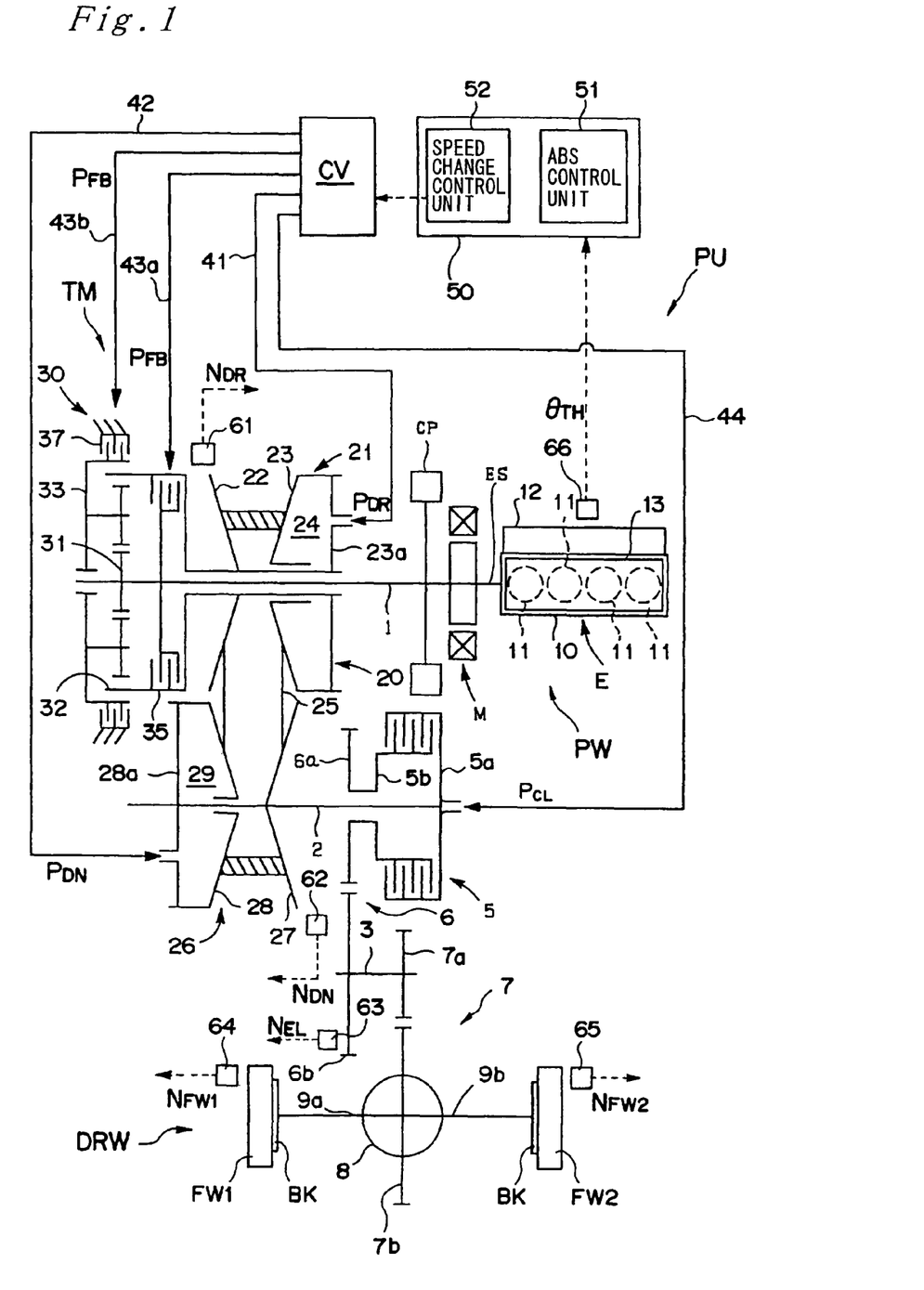
FIG. 1 is a configuration diagram showing the power unit of a vehicle provided with a stepless speed change device according to the present invention.

The following is an explanation of the preferred embodiments of the present invention, based on the drawings. FIG. 1 is a configuration diagram showing a power unit PU of a four-wheeled vehicle equipped with a control device according to the present invention. The vehicle is a two-wheel drive vehicle, with the left and right front wheels FW1, FW2 as the drive wheels DRW. The power unit PU includes a hybrid-type power source PW and a stepless speed change device TM. The power source PW includes an engine E, and an electric motor and generator M. The stepless speed change device TM changes the speed of the output of the power source PW without steps, and transmits the output to the drive wheels DRW.

The engine E is a reciprocating engine that includes pistons disposed within cylinder chambers 11, 11 formed in a cylinder block 10. The engine E includes an intake and exhaust air device 12 that draws air into and discharges the air from the cylinder chambers 11, 11, a fuel supply device 13 that supplies fuel to each cylinder chamber 11, 11, and an ignition device (not shown in the drawings) that ignites the fuel supplied to each cylinder chamber 11, 11. The electric motor and generator M is disposed on an engine output shaft Es, and is supplied with electrical power from a battery (not shown on the drawings) that is mounted on the vehicle. The motor and generator M supplements the drive power of the engine E when starting or accelerating. Also, when decelerating, electrical power (energy recovery) is generated from the rotational drive power from the drive wheels DRW, to charge the battery.

The stepless speed change device TM includes an input shaft 1 connected to the engine output shaft Es via a coupling mechanism CP, a counter shaft 2 and a secondary shaft 3 each disposed parallel to the input shaft 1, a forward/reverse switching mechanism 30 disposed on the input shaft 1, a metal V-belt mechanism 20 disposed between the input shaft 1 and the counter shaft 2, a starting clutch 5 disposed on the counter shaft 2, a first gear train 6 disposed between the counter shaft 2 and the secondary shaft 3, and a second gear train 7 disposed between the secondary shaft 3 and a differential mechanism 8. In this way, the drive power transmission path is constituted from the input shaft 1, the forward/reverse switching mechanism 30, the metal V-belt mechanism 20, the counter shaft 2, the first gear train 6, the secondary shaft 3, and the second gear train 7.

The metal V-belt mechanism 20 includes a variable pulley width drive side pulley 21 disposed on the input shaft 1, a variable pulley width driven side pulley 26 disposed on the counter shaft 2, and a metal V-belt 25 wound between the two pulleys 21, 26. The drive side pulley 21 can freely rotate relative to the input shaft 1, and includes a fixed half pulley 22 that is fixed in the axial direction, and a movable half pulley 23 that can move in the axial direction relative to the fixed half pulley 22. A drive side cylinder chamber 24 that is enclosed by a cylinder wall 23a is formed in the side of the movable half pulley 23. The movable half pulley 23 moves in the axial direction in accordance with the pressure of hydraulic oil supplied to the drive side cylinder chamber 24. Also, the driven side pulley 26 includes a fixed half pulley 27 fixed to the counter shaft 2, and a movable half pulley 28 that can move in the axial direction relative to the fixed half pulley 27. A driven side cylinder chamber 29 that is enclosed by a cylinder wall 28a is formed in the side of the movable half pulley 28. The movable half pulley 28 moves in the axial direction in accordance with the pressure of hydraulic oil supplied to the driven side cylinder chamber 29. By controlling the pressure (speed change control hydraulic pressure) of the hydraulic oil supplied to the two cylinders 24, 29, the pulley groove width of the two pulleys 21, 26 is varied, the winding radius of the metal V-belt 25 changes, and the speed change ratio can be varied without steps.

The forward/reverse switching mechanism 30 includes a sun gear 31 connected to the input shaft 1; a ring gear 32 connected to the fixed half pulley 22; a carrier 33 that constitutes a single pinion type planet gear mechanism together with the sun gear 31 and the ring gear 32; a forward clutch 35 that can be engaged with the sun gear 31 and the ring gear 32; and a reverse brake 37 that can hold the carrier 33 fixed. When the forward clutch 35 is engaged, the sun gear 31, the ring gear 32, and the carrier 33 rotate together with the input shaft 1, and the drive side pulley 21 is rotated in the same direction as the input shaft 1 (the forward direction) by the drive power of the power source PW. On the other hand, when the reverse brake 37 is engaged, the carrier 33 is held fixed, the ring gear 32 rotates in the opposite direction to the sun gear 31, and the drive side pulley 21 is rotated in the opposite direction to the input shaft 1 (the reverse direction) by the drive power of the power source PW.

The starting clutch 5 is a hydraulically operated multiplate clutch, that includes an input side member 5a connected to the counter shaft 2, and an output side member 5b provided on the counter shaft 2 and that is capable of rotating relative to the counter shaft 2 and that can be engaged with the input side member 5a. The first gear train 6 is constituted by a first drive gear 6a provided on the counter shaft 2 and that is capable of rotating relative to the counter shaft 2 and that is connected to the output side member 5b of the starting clutch 5, meshed with a first driven gear 6b that is fixed to the secondary shaft 3. The second gear train 7 is constituted by a second drive gear 7a fixed to the secondary shaft 3, meshed with a second driven gear 7b connected to the differential mechanism 8. The starting clutch 5 disengages and engages the power transmission through the power transmission path between the counter shaft 2 and the first gear train 6, and transmits the output from the engine E whose speed has been changed by the metal V-belt mechanism 20 and generated on the counter shaft 2, to the drive gear 6a of the first gear train 6. When the starting clutch 5 is engaged, the output of the counter shaft 2 is transmitted to the differential mechanism 8 via the first gear train 6 and the second gear train 7, with a transmission ratio (slip ratio) in accordance with the state of engagement. When the starting clutch 5 is disengaged, power is not transmitted between the counter shaft 2 and the first gear train 6, and the stepless speed change device TM is in the neutral state.

The differential mechanism 8 divides the transmitted output left and right, and transmits the output to the drive wheels DRW via left and right axle shafts 9a, 9b.

The stepless speed change device TM includes a hydraulic pressure supply device that supplies hydraulic pressure to each of the hydraulic actuators (in other words, the two pulleys 21, 26, the forward clutch 35, the reverse clutch 37, and the starting clutch 5) in the stepless speed change device TM. The hydraulic pressure supply device includes a hydraulic pump (not shown on the drawings) that discharges hydraulic oil accumulated in an oil pan (not shown on the drawings), and a control valve CV that controls the pressure and supply direction of hydraulic oil discharged from the hydraulic pump. From the control valve CV, which is a solenoid valve, speed change control hydraulic pressure PDR, PDN is supplied to the cylinder chambers 24, 29 of the two pulleys 21, 26 via oil paths 41, 42, forward and reverse control hydraulic pressure PFB is supplied to the forward clutch 35 and the reverse clutch 37 via oil paths 43a, 43b, and starting control hydraulic pressure PCL is supplied to an oil chamber in the starting clutch 5 via an oil path 44.

The vehicle includes a control unit 50 having a speed change control unit 52 and an ABS control unit 51. The speed change control unit 52 sets the target value of the engine rotation speed Ne in accordance with the vehicle speed V and the position of the throttle valve θTH. The speed change control unit 52 then controls the solenoid control valve CV to change the speed ratio of the stepless speed change device TM (the metal V-belt mechanism 20) so that the actual value of the engine rotation speed Ne is the same as the target value. The ABS control unit 51 controls the braking power of the wheels to avoid locking of the wheels when it is determined that the wheels are slipping, based on the vehicle speed and the rotation speed of the wheels. A target value of the rotation speed NDR of the drive side pulley 21 connected to the input shaft 1 via the forward/reverse switching mechanism 30 is set, in order to make the engine rotation speed Ne equal to the target value.

The vehicle includes the control unit 50 having an ABS control unit 51 that controls the braking force acting on the wheels from braking devices BK, to avoid the wheels locking when the wheels are in the slipping state, and the speed change control unit 52 that carries out speed change control by changing the speed change ratio of the stepless speed change device TM (metal V-belt mechanism 20) in accordance with the vehicle speed V and the acceleration or deceleration required by the driver.

Also, a plurality of sensors that measure various types of operating state, and output the measurement values to the control unit 50, is disposed within the vehicle. For example, as shown in FIG. 1, a drive side pulley rotation speed sensor 61 that measures the rotation speed NDR of the drive side pulley 21, a driven side pulley rotation speed sensor 62 that measures the rotation speed NDN of the driven side pulley 26, a secondary shaft rotation speed sensor 63 that measures the rotation speed NEL of the secondary shaft 3 that forms the output side of the metal V-belt mechanism 20 and the starting clutch 5, first and second drive wheel rotation speed sensors 64, 65 that measure the rotation speeds NFW1, NFW2 of the left and right front wheels FW1, FW2 that are the drive wheels DRW, and a position sensor 66 that measures the position θTH of the throttle valve provided in the intake and exhaust air device 12 of the engine E and that controls the intake air flow rate to each cylinder chamber 11, 11, are provided. In this way, a plurality of sensors is disposed within the vehicle to measure the rotation speed of the rotating members that constitute the power transmission path and the wheels. However, from the measurement values of these sensors it is possible to obtain the vehicle speed V and the rotation speed of other rotating members that constitute the power transmission path, taking into consideration the speed change ratio and the slip ratio of the starting clutch 5.

The ABS control unit 51 determines whether the drive wheels are slipping or not based on the difference and the ratio of the rotation speeds NFW1, NFW2 of the left and right drive wheels DRW measured by the first and second drive wheel rotation sensors 64, 65. Based on the determined result, the ABS control unit 51 adjusts the hydraulic pressure supplied to the braking devices BK to control the braking force acting on the wheels. Also, the control unit 50 obtains the actual value of the ratio of the input and output rotation speeds (slip ratio) of the starting clutch 5 based on the input side rotation speed of the starting clutch 5 measured by the driven side pulley rotation speed sensor 62, and the output side rotation speed of the starting clutch 5 obtained from the measurement value of the secondary shaft rotation speed sensor 63. Then the control unit 50 carries out a control to appropriately adjust the slip ratio of the starting clutch 5, by activating the control valve CV to adjust the clutch control hydraulic pressure PCL, so that the actual value is made to coincide with a target value set in accordance with the operating conditions.

The speed change control unit 52 obtains target values of the engine rotation speed and the drive side pulley 21 rotation speed based on the vehicle speed V and the position of the throttle θTH. Then the speed change control unit 52 carries out a control to change the speed change ratio of the metal V-belt mechanism 20 by activating the control valve CV and adjusting the speed change control hydraulic pressure PDR, PDN so that the actual values of the engine rotation speed and drive side pulley 21 rotation speed are made to coincide with these target values.

Figure 2:
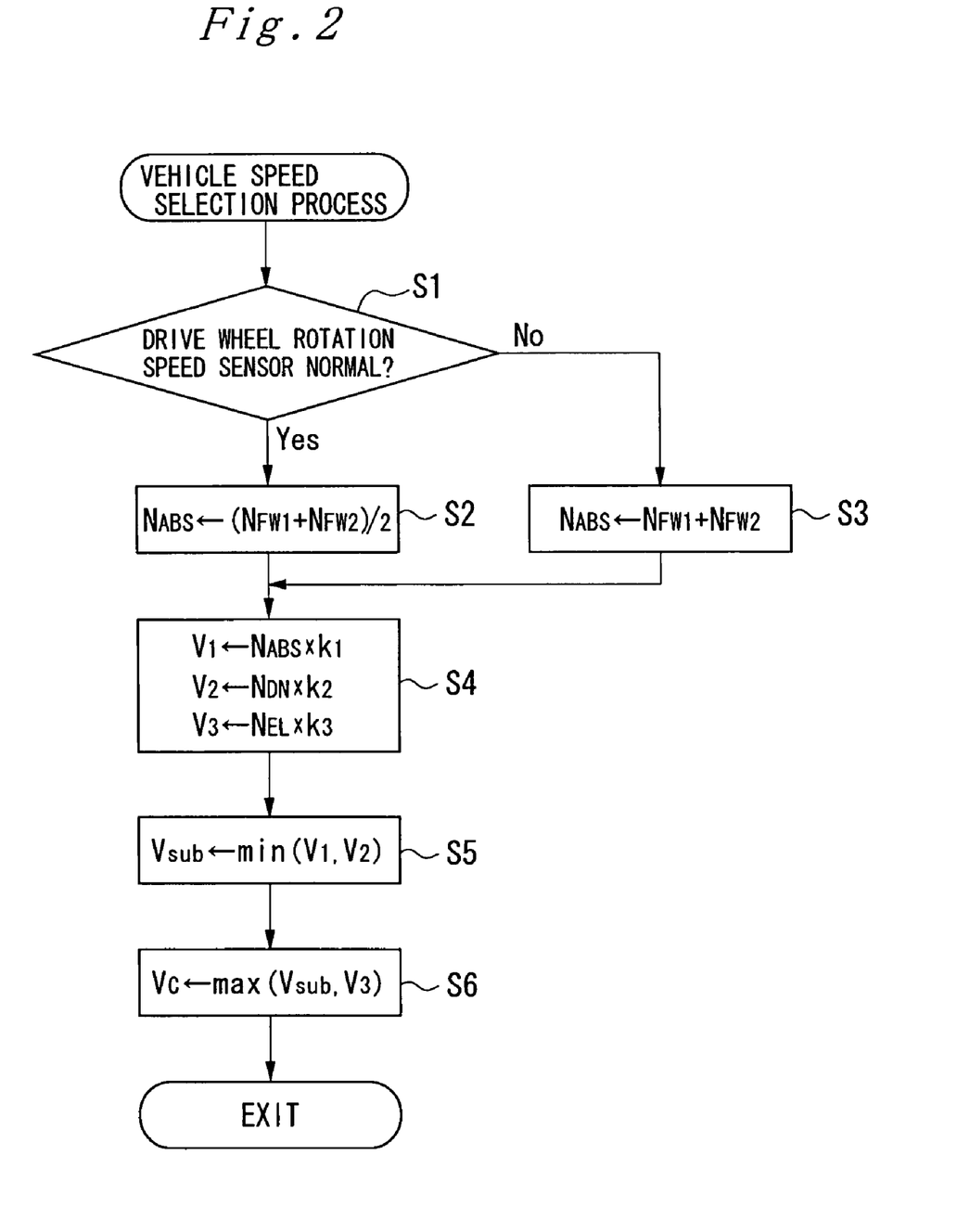
FIG. 2 is a flowchart showing the process for selecting the control speed.

The following is an explanation of the details of the process for selecting the control vehicle speed Vc, which is the vehicle speed V which is used as an input parameter in speed change control, from the various vehicle speeds obtained from the measurement values of this plurality of sensors, with reference to FIG. 2. In the present embodiment, a selection is made from three vehicle speeds V1 through V3 obtained from the measurement values of three types of sensor: the secondary shaft rotation speed sensor 63, the driven side pulley rotation speed sensor 62, and the first and second drive wheel rotation speed sensors 64, 65. As described above, the measurement values of these sensors 62 through 65 are also used in the control of the braking force and the control of engagement of the starting clutch 5 by the ABS control unit 51.

As shown in FIG. 2, first it is determined whether the first and second drive wheel rotation speed sensors 64, 65 are operating normally or not (Step S1). Here, If it is determined that both the first and second drive wheel rotation speed sensors 64, 65 are operating normally, the rotation speed NFW2 of the right front wheel FW2 measured by the second drive wheel rotation speed sensor 65 is set as the wheel speed NABS (Step S2). If a breakdown is detected in the drive wheel rotation speed sensors 64, 65, a signal indicating that the rotation speed is zero is output to the control unit 50. When it is determined that there is a breakdown in either the first or second drive wheel rotation speed sensors 64, 65, the sum of the rotation speed NFW1 of the left front wheel FW1 and the rotation speed NFW2 of the right front wheel FW2 is set as the wheel speed NABS (Step S3).

Next, the vehicle speed (first vehicle speed) V1 is calculated from the set wheel speed NABS, the vehicle speed (second vehicle speed) V2 is calculated from the driven side pulley rotation speed NDN 5 measured by the driven side pulley rotation speed sensor 62, and the vehicle speed (third vehicle speed) V3 is calculated from the secondary shaft 3 rotation speed NEL measured by the secondary shaft rotation speed sensor 63 (Step S4). The coefficients k1 through k3 for obtaining the first through third vehicle speeds V1 through V3 are set in accordance with the gear ratios of the first and second gear trains, the slip ratio of the starting clutch 5, and so on, and to convert dimensions.

Then the first vehicle speed V1 and the second vehicle speed V2 are compared, and the lower of the two is selected as the substitute vehicle speed Vsub (Step S5). Also, the selected substitute vehicle speed Vsub and the third vehicle speed V3 are compared, and the higher of the two is selected to be the control vehicle speed Vc (Step S6). The control vehicle speed Vc selected in this way is used as an input parameter for setting the target values of engine rotation speed and drive side pulley 21 rotation speed in speed change control.

Figure 3:
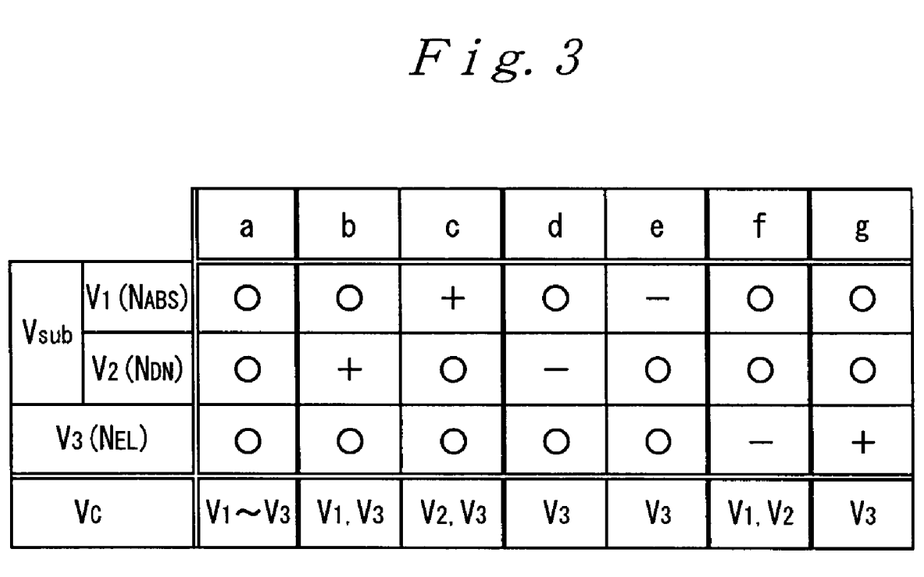
FIG. 3 is an explanation diagram showing the control rotation speed that is selected in accordance with the state of each sensor.

FIG. 3 shows the control vehicle speed Vc selected through the process described above. In FIG. 3, the symbol "o" indicates that the corresponding sensor is in the state of outputting a normal value, the "+" symbol indicates that the corresponding sensor is in the state of outputting a signal with a faulty value on the high side of the correct value, and the "−" symbol indicates that the corresponding sensor is in the state of outputting a signal with a faulty value on the low side of the correct value.

As shown in the column a, when signals indicating normal values are output from each sensor 62 through 65, the higher of the substitute speed Vsub and the third speed V3 is selected as the control vehicle speed Vc. This control vehicle speed Vc is used as the vehicle speed V for carrying out speed change control. Here, if in Step S6 the lower of the two speeds is selected as the control vehicle speed Vc, the speed change ratio would be set on the low side. Therefore, the acceleration or deceleration corresponding to operation of the accelerator pedal would be oversensitive due to the vehicle speed V in this case, which might affect the running properties. By selecting the higher speed as the control vehicle speed Vc in Step S6, as in the present embodiment, and using this control vehicle speed Vc as the vehicle speed V, there is no problem with sudden changes of the acceleration or deceleration due to operation of the accelerator pedal, so the running properties can be stabilized.

As shown in column b, when the driven side pulley rotation speed NDN is a faulty value on the high side relative to the correct value, the first vehicle speed V1 obtained from the wheel speed NABS, which is a correct value, is selected as the substitute vehicle speed Vsub. The control vehicle speed Vc is selected from among this substitute vehicle speed Vsub and the third vehicle speed V3 obtained from the secondary shaft rotation speed NEL, which is a correct value. Therefore, a speed change ratio that does not suit the operating conditions based on the driven side pulley rotation speed NDN which is showing faulty values is not set, so a worsening of the fuel consumption is prevented. As shown in column c, when the wheel speed NABS is a faulty value on the high side relative to the correct value, in the same way the control vehicle speed Vc is selected from among the first vehicle speed V1 obtained from the driven side pulley rotation speed NDN, which is a correct value, and the third vehicle speed V3 obtained from the secondary shaft rotation speed NEL, which is a correct value.

As shown in column d, when the driven side pulley rotation speed NDN is showing a faulty value on the low side of the correct value, the second vehicle speed V2 obtained from the faulty value is selected as the substitute vehicle speed Vsub. However, in Step S6 the third vehicle speed V3 obtained from the secondary shaft rotation speed NEL, which is a correct value, is selected as the control vehicle speed Vc. Therefore, a speed change ratio that does not suit the operating conditions based on the driven side pulley rotation speed NDN which is showing abnormal values is not set. Also, as shown in column e, when the wheel speed NABS is showing an abnormal value on the low side of the correct value, the third vehicle speed V3 is selected as the control vehicle speed Vc in the same way.

Also, as shown in column f, when the secondary shaft rotation speed NEL is showing a faulty value on the low side of the correct value, the substitute speed Vsub (V1 or V2), which is based on a correct value, is selected as the control vehicle speed Vc. Therefore, a speed change ratio that does not suit the operating conditions based on the secondary shaft rotation speed NEL which is showing a faulty value is not set.

As shown in column g, when the secondary shaft rotation speed NEL is showing a faulty value on the high side of the correct value, the third vehicle speed V3 obtained from this faulty value is selected as the control vehicle speed Vc.

Here, a breakdown detection device, that is not shown in the drawings, provided within the control unit 50 detects whether breakdown has occurred and a signal with a faulty value is being output by the driven side pulley rotation speed sensor 62, the drive wheel rotation speed sensors 64, 65, or the secondary shaft rotation speed sensor 63. When a breakdown is detected, the breakdown detection device carries out a predetermined fail safe operation, to prevent worsening of the running condition due to control being carried out based on a measurement signal from a sensor that has a breakdown. For example, if two sensors have a breakdown at the same time, and if the speed change ratio is set based on the faulty values, after the breakdown detection device has detected that these two sensors have a breakdown, a fail safe operation is carried out by fixing the speed change ratio of the metal V-belt mechanism 20 to a predetermined value (for example, low), regardless of the vehicle speed V or the throttle position θTH.

In the present embodiment, apart from the situation shown in column g of FIG. 3, even when a sensor is outputting a signal showing a faulty value, this faulty value is not selected as the control vehicle speed Vc, so speed change control using faulty values does not occur. Therefore, even without carrying out the fail safe operation corresponding to sensor breakdown, speed change control suitable for the operating conditions is continued. In this way, sudden changes in the behavior of the vehicle due to control using faulty values does not occur, and the running properties do not suffer.

In particular, the lower of the first and second vehicle speeds V1, V2 is selected as the substitute vehicle speed Vsub, and the higher of this substitute vehicle speed Vsub and the third vehicle speed V3 is selected as the control vehicle speed Vc. By selecting the higher vehicle speed as the control vehicle speed Vc in this way, stability of the running properties can be ensured. According to the present embodiment, of the three types of sensor, even if the drive wheel rotation speed sensors 64, 65 and the driven side pulley rotation speed sensor 62 are in a state where they are outputting a signal with a faulty value on the high side, speed change control based on the faulty value is not carried out, and it is possible to continue speed change control for stable running properties.

Also, the three types of sensor used to obtain the vehicle speed are used not only in speed change control, but also for control of the braking force on the wheels, and for control of engagement of the starting clutch. In this way, none of the plurality of sensors provided to obtain the vehicle speed is a dedicated sensor for obtaining the vehicle speed. Therefore it is possible to provide a stepless speed change device TM or control unit 50 having the effect described above, without increasing the number of components, and with minimum cost increase.

Up to here an embodiment of the present invention has been explained. However, the scope of the present invention is not limited to the configuration as described above. For example, the process in FIG. 2 shows the case where the measurement values of the plurality of sensors are converted in advance into vehicle speed, and compared. However, if these measurement values are converted into the rotation speed of a specific rotating member of the power transmission members and compared, and if a process is carried out to convert the rotation speed from the comparison result to the vehicle speed, the same result will be obtained, so the same effect can be obtained as in the configuration described above.

Figure 4:
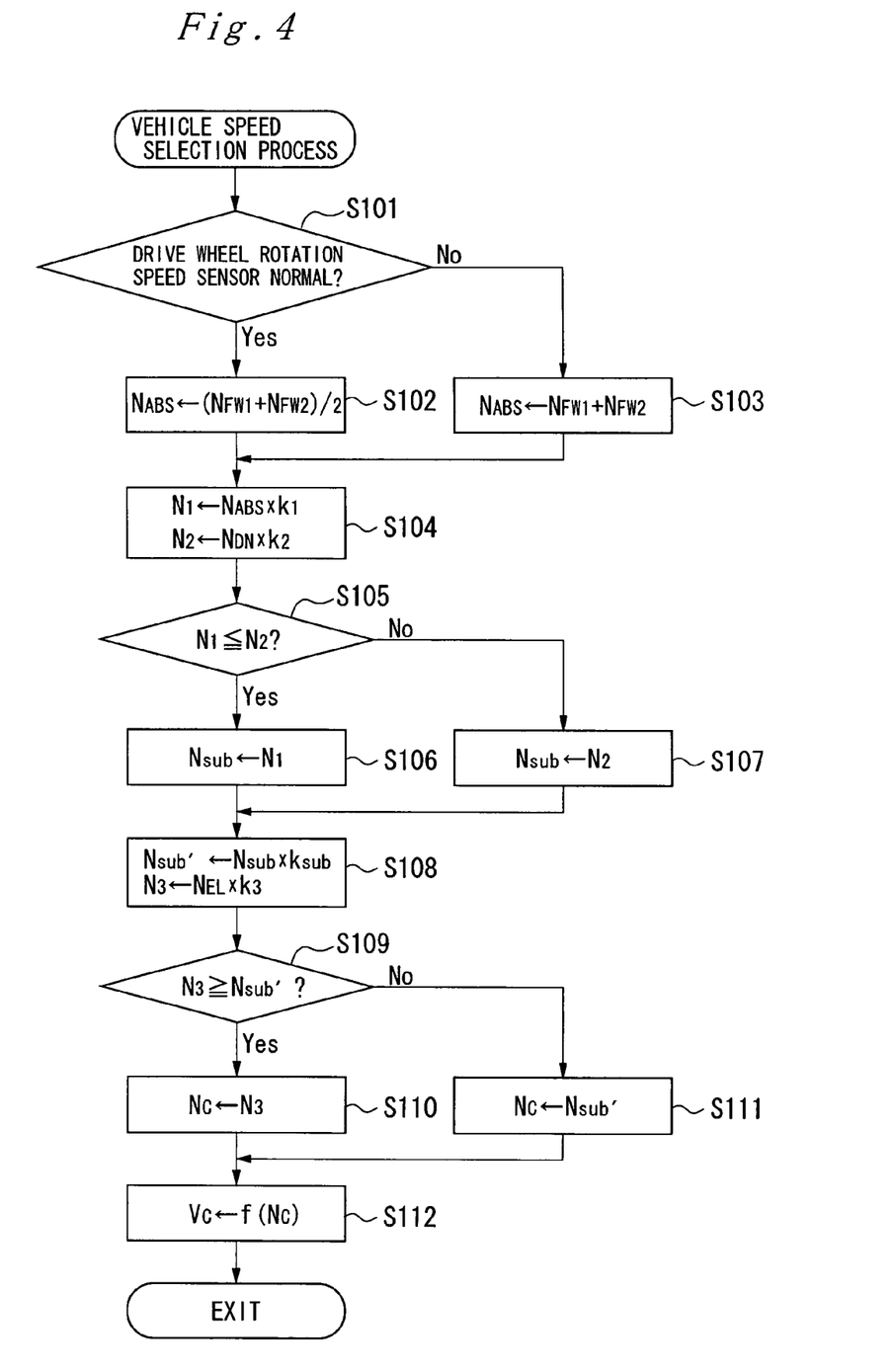
FIG. 4 is a flowchart showing a modified example of the process for selecting the control speed.

FIG. 4 shows the details of the process for the modified example described above. First, the wheel speed NABS is set in the same way as in Steps S1 through S3 shown in FIG. 2 (Steps S101 through S103). Next, the set wheel speed NABS is converted into a counter shaft 2 rotation speed (first rotation speed) N1, which is the rotating member used as the comparison standard. The driven side pulley rotation speed NDN is converted into a counter shaft 2 rotation speed (second rotation speed) N2, which is the rotating member used as the comparison standard in the same way (Step S104). Then, the first rotation speed N1 and the second rotation speed N2 are compared (Step S105), and the lower of the two rotation speeds is selected as the substitute rotation speed Nsub (Steps S106, S107).

Next, the selected substitute rotation speed Nsub is converted into a rotation speed of the secondary shaft 3 (converted substitute rotation speed) Nsub', which is the rotating member used as the comparison standard. The secondary shaft rotation speed NEL is converted into a secondary shaft 3 rotation speed (third rotation speed) N3, which is the same comparison standard rotating member (Step S108). Then, the third rotation speed N3 and the converted substitute rotation speed Nsub' are compared (Step S109), and the higher of the two rotation speeds is selected and set as the control rotation speed Nc (Steps S110, 111). In this way, the control vehicle speed Vc is obtained from the selected control rotation speed Nc (Step S112).

Here, in Step S105 the counter shaft 2 is used as the rotating member comparison standard, and in Step S109 the secondary shaft 3 is used as the rotating member comparison standard. The coefficient k1 for converting from the wheel speed NABS to the first rotation speed N1 is set in accordance with the gear ratios of the first and second gear trains 6, 7 and the slip ratio of the starting clutch 5. The coefficient k2 for converting from the driven side pulley rotation speed NDN to the second rotation speed N2 is set to 1 because the driven side pulley 26 rotates integrally with the counter shaft 2. The coefficient ksub for converting from the substitute rotation speed Nsub to the converted substitute rotation speed Nsub' is set in accordance with the slip ratio of the starting clutch 5 and the gear ratio of the first gear train. The coefficient k3 for converting from the secondary shaft rotation speed NEL to the third rotation speed N3 is set to 1. However, this modified example is just an example, and it is possible to select the rotating member to be set as the comparison standard as appropriate. The coefficients k1 through k3, ksub can be changed and set as appropriate in accordance with the selected rotation member.

Also, the comparisons in Steps S5, S6, S105, S109 are not limited to simple greater or less than comparisons. It is also possible to determine whether the rotation speed difference or the ratios of rotation speeds exceeds a predetermined value.

In the speed change control described above, a target value of the engine rotation speed or the drive side pulley 21 rotation speed is set in accordance with the vehicle speed V and the position of the throttle θTH. Then a control is carried out to change the speed change ratio of the metal V-belt mechanism 20 so that the actual engine rotation speed or the actual value of the drive side pulley 21 rotation speed is made to coincide with the target value. However, a target value of the speed change ratio of the metal V-belt mechanism 20 may be set in accordance with the vehicle speed V and the throttle position θTH, and a control carried out to change the speed change ratio so that the actual speed change ratio is made to coincide with the target value. In this case it is possible to obtain the actual speed change ratio from the drive side pulley rotation speed NDR measured by the drive side pulley rotation speed sensor 61, and the driven side pulley rotation speed NDN measured by the driven side pulley rotation speed sensor 62. Also, the present invention is not limited to a stepless speed change device using a V-belt, and the present invention can be applied to a stepless speed change device of another configuration in the same way. Furthermore, the present invention is not necessarily limited to a speed change mechanism that changes the speed of the output of the engine with no steps. The present invention may also be applied in the same way to a form of speed change mechanism set with predetermined speed change steps.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2006-254683 filed on Sep. 20, 2006, which is incorporated herein by reference.

What is claimed is:

1. A vehicle transmission comprising:

a speed change mechanism which is mounted in a vehicle, and which changes the speed of output of an engine and transmits the output to wheels;

a clutch mechanism which is disposed in a power transmission path from the speed change mechanism to the wheels, and which engages and disengages power transmission via the power transmission path; and a speed change control device which carries out speed change control of the speed change mechanism in accordance with the speed of the vehicle and the position of a throttle of the engine or an accelerator pedal, wherein the speed change control device comprises:

first vehicle speed selection means for comparing a first vehicle speed obtained from a rotation speed of the wheels and a second vehicle speed obtained from a rotation speed of an output member of the speed change mechanism, and selecting the lower of the first and second vehicle speeds as a substitute vehicle speed; and second vehicle speed selection means for comparing a third vehicle speed obtained from an output side rotation speed of the clutch mechanism and the substitute vehicle speed, and selecting the higher of the third vehicle speed and the substitute vehicle speed as a control vehicle speed, the vehicle transmission carrying out speed change control using the control speed as the vehicle speed.

2. The vehicle transmission according to claim 1, further comprising a braking control device that controls braking force applied to the wheels in accordance with the rotation speed of the wheels.

3. The vehicle transmission according to claim 1 or claim 2, wherein the speed change mechanism is a stepless speed change mechanism that changes the speed of the output of the engine without steps.

4. The vehicle transmission according to claim 3, wherein the speed change control device sets a target value of the engine rotation speed in accordance with the speed of the vehicle and the position of the throttle of the engine, and carries out control to change a speed change ratio of the stepless speed change mechanism so that the actual engine rotation speed is made to coincide with the target value.

5. The vehicle transmission according to claim 3, wherein the speed change control device sets a target value of a speed change ratio of the stepless speed change mechanism in accordance with the speed of the vehicle and the position of the throttle of the engine, and carries out control to change the speed of the stepless speed change mechanism so that the actual speed change ratio obtained from the rotation speeds of the input member and the output member of the stepless speed change mechanism is made to coincide with the target value.

* * * * *